United States Patent Office 3,381,035
Patented Apr. 30, 1968

3,381,035
PROCESS FOR PRODUCING 2-SUBSTITUTED
CYCLOPENTANE-1,3-DIONES
Takuichi Miki, Amagasaki, Kentaro Hiraga, Ikeda, Tsunehiko Asako, Suita, and Hirotomo Masuya, Kobe, Japan, assignors to Takeda Chemical Industries, Ltd., Osaka, Japan
No Drawing. Filed Feb. 18, 1966, Ser. No. 528,610
Claims priority, application Japan, Feb. 18, 1965, 40/9,500
7 Claims. (Cl. 260—586)

ABSTRACT OF THE DISCLOSURE 2-alkyl cyclopentane-1,3-dione is prepared by (a) reacting cyclopent-4-ene-1,3-dione with a compound of the formula

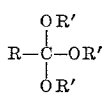

wherein R is H or alkyl and R' is alkyl with 1 to 4 carbon atoms. The resultant novel 2-alkoxyalkylidene cyclopent-4-ene-1,3-dione is then (b) catalytically reduced with hydrogen to yield the desired compound.

---

The present invention relates to a process for producing 2-substituted cyclopentane-1,3-diones. More concretely, the present invention relates to a process for producing 2-substituted cyclopentane-1,3-diones, which comprises allowing cyclopent-4-ene-1,3-dione to react with a lower alkyl ester of ortho-acid having the Formula (II):

wherein R is H or alkyl containing from 1 to 3 carbon atoms and R' is alkyl containing from 1 to 4 carbon atoms, (e.g. methyl, ethyl, n-propyl, isopropyl and n-butyl), followed by subjecting the resulting 2-alkoxyalkylidene-cyclopent-4-ene-1,3-diones to a catalytic reduction.

2-substituted cyclopentane-1,3-diones are useful as intermediates for synthesizing steroids (cf. Chemistry and Industry, 1960, pages 1022–1023; Proceedings of Chemical Society, 1963, page 139) and have been produced from the corresponding 1,3,4-triones by a series of reactions where so-called Wolff-Kishner reduction or Clemmensen reduction is employed.

However, these known processes necessarily require the use of the 2-substituted cyclopentane-1,3,4-triones as the starting material and this very requisite makes it difficult to apply the known processes to industrial production of the 2-substituted cyclopentane-1,3-diones. One of the main difficulties is due to the property of the 1,3,4-triones that they have a high solubility in water but are hardly soluble in hydrophobic solvents. Consequently, an unreasonably long time and troublesome procedures are required in order to purify the 1,3,4-triones to a degree sufficiently high enough to be employed as the starting material in the known processes. Another difficulty comes from inconveniences in operating the synthesis of the 1,3,4-triones by several known synthetic courses to the 1,3,4-triones.

Furthermore, in the case of Wolff-Kishner reduction, there must be used a semicarbazide which is rather expensive for an industrial production of the desired materials.

Therefore, in spite of the outstanding success in the elaborated total synthesis of steroids, one of the reasons why the total synthesis has not yet been successfully put into industrial production is attributable to the above-mentioned drawbacks in the known processes for the production of the 2-substituted cyclopentane-1,3-diones.

In the course of study to overcome the foregoing difficulties and other disadvantages, the present inventors have unexpectedly found that a lower alkyl ester of ortho-acid is capable of reacting with cyclopent-4-ene-1,3-dione to introduce 2-alkoxyalkylidene group into the 2-position of the latter, and furthermore, that when the resulting 2-substituted cyclopent-4-ene-1,3-diones are brought into contact with about three moles or a little more of hydrogen gas per molecule in the presence of a known catalyst for catalytic reduction, the alkoxyalkylidene group at the 2-position and the 5:4-double bond are selectively reduced in one step without affecting the two oxo groups at 1- and 3-positions, to produce the corresponding 2-alkylcyclopentane-1,3-diones in good yield.

In this kind of technical field, these phenomena can be regarded as quite unusual.

The process of this invention is based upon these phenomena, which are excellently effective for the production of steroids on a commercial scale.

It is an object of the present invention to provide an effective and economical method for producing 2-substituted cyclopentane-1,3-diones.

Another object is to provide novel 2-alkoxyalkylidene cyclopent-4-ene-1,3-diones by the process of the present invention. Namely, the present invention comprises reacting cyclopent-4-ene-1,3-diones with a lower alkyl ester of ortho-acid, whereby novel 2-alkoxyalkylidene cyclopent-4-ene-1,3-diones are formed, followed by subjecting the resulting product to a catalytic reduction.

The first step of the method of this invention is to react cyclopent-4-ene-1,3-dione (Compound I) with a lower alkyl ester of ortho-acid (Compound II) to give 2-alkoxyalkylidene cyclopent-4-ene-1,3-diones (Compound III).

The cyclopent-4-ene-1,3-dione is representable by Formula (I):

and may be prepared by known method, for example, by that described in Organic Syntheses 42, 36, (1962).

The reaction between the cyclopent-4-ene-1,3-dione and lower alkyl ester of ortho-acid (II) is carried out with or without the use of an organic solvent. Any compatible organic solvent, e.g. acetic anhydride, propionic anhydride, toluene, xylene or benzene, etc. may be used.

The reaction is accelerated by heating and also by the presence of an acid catalyst such as inorganic acids (e.g. sulfuric acid, phosphoric acid), sulfonic acids (e.g. methanesulfonic acid, ethanesulfonic acid, toluenesulfonic acid), so-called Lewis acids (e.g. boron trifluoride and zinc chloride), etc.

It is usually preferred to carry out the reaction at a temperature of about 50–150° C. for about 10 hours.

When acetic anhydride or propionic anhydride is employed as organic solvent, the corresponding ester is formed as a by-product, which may be eliminated from the reaction mixture by heating in order to displace the equilibrium towards acceleration of the reaction. Organic solvent used may be eliminated from the reaction system as azeotropic mixture for the same purpose.

The resulting 2-alkoxyalkylidene cyclopent-4-ene-1,3-diones (III) are novel, having a structure represented by the Formula (III):

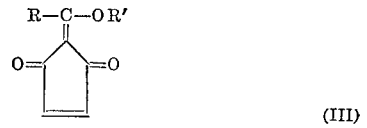

wherein R and R' have the same meaning as defined in Formula (II).

In the method of the present invention, the resulting Compound (III) in the reaction mixture need not be separated, but the reaction mixture can directly be reduced.

The second step of the method of this invention is a catalytic reduction of Compound (III), resulting in producing 2-substituted cyclopentane-1,3-dione (Compound IV) mentioned below in a one-step procedure.

The 2-substituted 1,3-diones have the general structure represented by the Formula (IV):

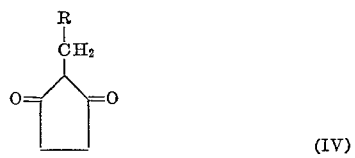

(IV)

wherein R has the same meaning as defined in the Formula (V). Catalysts applicable to the reduction of the Compound (III) to the corresponding Compound (IV) include, for example palladium, nickel, ruthenium or platinum catalysts. The reaction is usually carried out in a solvent. A desirable solvent can be selected from commonly usable compatible organic solvents, and it may be exemplified as lower alcohols (e.g. methanol, ethanol, etc.), ketones (e.g. acetone, methyl ethyl ketone, cyclohexanone, etc.), ethers (e.g. tetrahydrofuran, dioxane, etc.) and the like.

As mentioned hereinbefore, by the use of the present invention the 2-stubstituted cyclopentane-1,3-diones can be prepared easily from cyclopent-4-ene-1,3-dione as the starting material, and the process is remarkably useful for the industrial production of steroids.

For the purpose of giving those skilled in the art a better undersanding of the invention, the following illustrative examples of presently preferred embodiments are given.

In these examples, parts are by weight unless otherwise specified, and parts by weight bear the same relation to parts by volume as do grams to milliliters.

EXAMPLE 1

To a solution of 3 parts of cyclopent-4-ene-1,3-dione in 7.2 parts of acetic anhydride are added 5.4 parts of ethyl orthoformate and 0.5 part of anhydrous zinc chloride. The mixture is agitated at 70–80° C. for 6 hours while removing ethyl acetate from the reaction system by evaporation, and then filtered to remove zinc chloride. The filtrate is concentrated and cooled to give crystals, which are recrystallized from ether to give 2-ethoxy methylidene cyclopent-4-ene-1,3-dione as yellowish needles melting at 80–81.5° C. Yield: 2.5 parts.

*Elementary analysis.*—Calculated for $C_8H_8O_3$: C, 63.15%; H, 5.30%. Found: C, 63.77%; H, 5.21%.

Ultraviolet absorption:

$\lambda_{max.}^{EtOH}$ 253 m$\mu$ ($\epsilon=17{,}000$); 221.5 m$\mu$ ($\epsilon=15{,}700$).

Nuclear magnetic resonance (in tetrachloromethane)

$\tau$ 8.50 ($\underline{CH_3}$—$CH_2$—)

5.61 ($CH_3$—$\underline{CH_2}$—)

3.06 (C=C with H, H)

2.75 (O—C=O with H)

To a solution of 0.4 part of thus obtained 2-ethoxy-methylidene cyclopent-4-ene-1,3-dione in 50 parts by volume of ethyl alcohol is added 0.3 part of 5% palladium-carbon as a catalyst. The mixture is shaken in a stream of hydrogen gas. After 190 parts by volume of hydrogen gas (15° C., 1 atm.) are absorbed, the mixture is filtered to remove the catalyst. The filtrate is concentrated to leave 0.28 part of crystals, which are recrystallized from water to obtain 2-methyl cyclopentane-1,3-dione as slightly yellowish needles melting at 205–210° C.

Use of 0.3 part of 5% Raney-nickel as catalyst in place of 0.3 part of 5% palladium-carbon gives a result similar to the above.

EXAMPLE 2

To a solution of 2 parts of cyclopent-4-ene-1,3-dione in 9.5 parts of acetic anhydride are added 7.4 parts of ethyl orthopropionate and 0.8 part of anhydrous zinc chloride. The mixture is agitated at 80–90° C. for 4 hours while removing ethyl acetate from the reaction system by evaporation, and then filtered to remove zinc chloride. The filtrate is concentrated to give a black oily residue, which is subjected to chromatography by the use of a column packed with silica gel, and the column is then eluted with benzene to obtain 1.5 parts of 2-ethoxy propylidene cyclopent-4-ene-1,3-dione as yellowish substance.

Ultraviolet absorption: $\lambda_{max.}^{EtOH}$ 272 m$\mu$ ($\epsilon=16{,}760$); 222 m$\mu$ ($\epsilon=13{,}720$).

Infrared absorption: $\nu_{max.}^{Nujol}$ 1720, 1670, 1590 cm.$^{-1}$; 1570 (peak).

Nuclear magnetic resonance (in tetrachloromethane)

$\tau$ 8.33 (3H, $t$, —C—$CH_2$—$\underline{CH_3}$)

8.57 (3H, $t$, —O—$CH_2$—$\underline{CH_3}$)

7.60 (2H, $q$, —C—$\underline{CH_2}$—$CH_3$)

5.60 (2H, $q$, —O—$\underline{CH_2}$—$CH_3$)

3.20 (2H, $s$, —$\underline{CH=CH}$)

To a solution of 1 part of thus-obtained 2-ethoxy- propylidene cyclopent-4-ene-1,3-dione in 70 parts by volume of ethyl alcohol is added 0.1 part of 5% palladium-carbon as catalyst, and the mixture is shaken in a hydrogen stream. After 390 parts by volume of hydrogen (20° C., 1 atm.) are absorbed, the mixture is filtered to remove the catalyst. The filtrate is concentrated to leave crystals, which are recrystallized from a mixture of water and ethyl alcohol (8:2) to obtain 0.7 part of 2-propyl-cyclopentane-1,3-dione as colorless scaly crystals.

*Elementary analysis.*—Calculated for $C_8H_{12}O_2$: C, 68.54%; H, 8.63%. Found: C, 68.89%; H, 8.53%.

Ultraviolet absorption: $\lambda_{max.}^{EtOH}$ 250.5 m$\mu$ ($\epsilon=16{,}240$).

Infrared absorption: $\nu_{max.}^{Nujol}$ 3,000–1,700 cm.$^{-1}$ (broad); 1,550 cm.$^{-1}$.

Use of 0.1 part of 5% Raney-nickel as catalyst in place of 0.1 part of 5% palladium-carbon gives a similar result as above.

What is claimed is:

1. A compound of the formula:

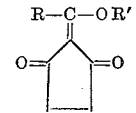

wherein R is H or alkyl containing from 1 to 3 carbon atoms and R' is alkyl containing from 1 to 4 carbon atoms.

2. A compound of the formula:

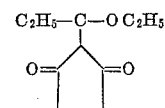

3. A compound of the formula:

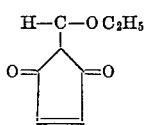

4. A process for the production of 2-alkyl cyclopentane-1,3-dione of the formula:

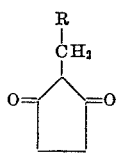

wherein R is H or alkyl with from 1 to 3 carbon atoms, which comprises bringing 2-alkoxyalkylidene cyclopent-4-ene-1,3-dione of the formula:

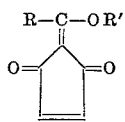

wherein R' is alkyl containing from 1 to 4 carbon atoms and R has the same meaning as defined above, into contact with hydrogen in the presence of a catalyst selected from the group consisting of palladium, nickel, ruthenium and platinum catalysts.

5. A process for producing a compound of the formula

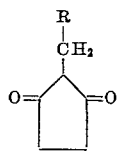

wherein R is H or alkyl containing from 1 to 3 carbon atoms, which comprises (a) reacting cyclopent-4-ene-1,3-dione with a lower alkyl ester of orthoacid of the formula:

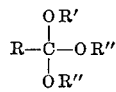

wherein R' is alkyl containing from 1 to 4 carbon atoms and R has the same meaning as defined above, at a temperature of about 50° to 150° C. to produce a compound of the formula:

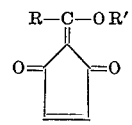

and (b) bringing the resultant compound into contact with hydrogen in the presence of a catalyst selected from the group consisting of palladium, nickel, ruthenium and platinum catalysts.

6. A process according to claim 4 wherein the reduction catalyst is Raney nickel.

7. A process according to claim 4 wherein the reduction catalyst is palladium-carbon.

References Cited

Jones, "J. Am. Chem. Soc.," vol. 74, pp. 4889 to 4891 (1952).

Elvidge et al., "J. Chem. Soc.," pp. 2251 and 2252 (1965).

BERNARD HELFIN, *Acting Primary Examiner.*

LEON ZITVER, *Examiner.*

M. JACOB, *Assistant Examiner.*